United States Patent Office 2,695,279
Patented Nov. 23, 1954

2,695,279

VINYL PLASTIC COMPOSITIONS AND METHOD OF MAKING THE SAME

Samuel Kahn, Wollaston, Mass., and Wilbur B. Pings, Highland Park, Ill., assignors to Godfrey L. Cabot, Inc., Boston, Mass., a corporation of Massachusetts No Drawing. Application August 4, 1950, Serial No. 177,783

10 Claims. (Cl. 260—31.6)

This invention relates to plastic compositions and more particularly to polymers and copolymers of vinyl halides plasticized with low (below 1000) molecular weight linear mixed esters and mixtures of mixed esters having the following general formula:

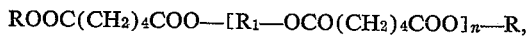

ROOC(CH₂)₄COO—[R₁—OCO(CH₂)₄COO]ₙ—R, in which R is an alkyl radical of 1 to 6 carbon atoms, R₁ is an alkylene or oxyalkylene radical and n has a value of 1 or more.

These polyesters are described and claimed in our copending application Serial No. 177,782 filed August 4, 190, concurrently herewith.

It is well known that synthetic resin compositions may be prepared from polymers and copolymers of vinyl halides by plasticizing such polymeric materials with compatible organic compounds having low volatility at elevated temperatures. Such vinyl resin compositions possess a combination of desirable properties which has permitted their employment in a wide variety of uses. Numerous compounds, particularly esters such as tricresyl phosphate, dioctyl phthalate (di-2-ethylhexyl phthalate) and the like, have been widely used as plasticizers.

We have discovered that certain mixed esters of adipic acid, a glycol and a monohydric aliphatic alcohol represented by the above formula exhibit outstanding properties as plasticizers for vinyl compositions, notably the polymers and copolymers of vinyl halides.

When in the above formula n equals 1 the ester consists of two adipic acid residues, one glycol residue and two terminal alkyl radicals. We refer to this material as bis ester. When n equals 2 the ester consists of three adipic acid residues, two glycol residues and two terminal alkyl groups and this may be designed tris ester. Similarly as the value of n increases the number of adipic acid and glycol residues increase in proportion but always linearly between the two terminal alkyl groups. The preferred plasticizer of our invention is actually a mixture of bis, tris and higher polymeric esters as discussed in more detail below.

Depending upon the manufacturing procedure followed the mixed esters of our invention may be produced as substantially pure bis ester wherein n of the formula has a value of 1. Preferably our novel composition will consist of a mixture of bis ester with higher polymeric esters in the proportions of from about 25 to 75% bis ester and from about 75 to 25% a mixture of the higher polymeric esters represented by n having values greater than 1, the whole mixture having an average molecular weight below about 1000.

We have found that these mixed esters possess a high affinity for vinyl resins and are easily incorporated therewith and thus are excellent plasticizers for such resins. These plasticizers give a soft, pliable vinyl plastic composition which retains its desirable properties even under severe service conditions. Additionally, these compounds have a characteristic low viscosity in relation to other compounds of comparable molecular weight.

Compositions of vinyl resins plasticized with mixed esters of the type herein described possess unusual heat stability and are capable of retaining excellent flexing properties and soft, pliable texture under accelerated test conditions.

There are a number of ways in which the plasticizers of our invention may be produced. For example, the acid chloride of a mono-alkyl adipate may be reacted with a glycol to give a glycol bis (alkyl adipate) ester. Or, the mono-alkyl adipate may be directly esterified with a glycol, likewise to form the bis ester. Still another method of preparation is by the reaction of adipic acid and a glycol to form a glycol adipate followed by the esterification with the selected alcohol. In this case the bis ester must be distilled from the reaction mix. A preferred method consists in reacting an excess of di-alkyl adipate with a glycol under ester interchange conditions in the presence of well-known basic or acidic esterification catalysts, such as H₂SO₄, paratoluene sulfonic acid and the like, the excess alcohol from the adipate being recovered for reuse. The resulting product, after removal of the unreacted di-alkyl adipate, will consist of a mixture of esters represented by n of the above formula having values of 1 and greater. If desired the bis ester can be separated from the mixture by appropriate fractionating techniques and used alone as the plasticizer. Preferably the plastic compositions of our invention will contain as the plasticizer mixtures of bis and higher polymeric esters proportioned as discussed above.

It is the principal object of our invention to provide as a new composition of matter, vinyl halide polymers and copolymers plasticized with the esters and mixtures of esters described above.

That the type of acid and limited range of alcohols used are critical is clear. When R is an aryl group for instance or contains more than 6 carbon atoms the resulting composition does not display the remarkable characteristics in the plasticization of polyvinyl chloride evidenced by the product of our invention. The same is true when acids other than adipic are used. For example, polyester mixtures prepared according to methods discussed above from dimethyl, diethyl and dibutyl phthalates and ethylene glycol were extremely viscous, in contrast with the materials derived from alkyl adipates, and were found to be of little value as plasticizers for polyvinyl chloride. In like manner, polyester mixtures were obtained by the interaction of an excess of dimethyl, diethyl and dibutyl phthalate with ethylene glycol and from di-isobutyl diglycolate and ethylene glycol, all of these products also being of high viscosity and showing no advantageous effect in polyvinyl chloride resin mixtures.

The following examples are illustrative of methods of preparation and of the compositions of our invention.

EXAMPLE 1

*Preparation of ethylene glycol bis (isobutyl adipate)*

(alternate name: di-isobutyl ethylene glycol diadipate)

C₄H₉OCO(CH₂)₄COO(CH₂)₂OCO(CH₂)₄COOC₄H₉

A vessel equipped with a reflux condenser was charged with 420 parts of the acid chloride of mono-isobutyl adipate (delta-carboisobutoxy valeroyl chloride, made by the reaction of thionyl chloride with mono-isobutyl adipate). The temperature of the liquid was brought to 100° C. and 59 parts of pure ethylene glycol was added during the course of 80 minutes, the temperature being allowed to rise to 148° C. A vigorous evolution of hydrochloric acid gas occurred. Xylene (170 parts) was added and the mixture maintained at the reflux (152–165° C.) for 90 minutes, during which time the evolution of hydrochloric acid ceased. The reaction mixture was washed with water and 10% sodium carbonate solution to remove acidic materials, the xylene removed by distillation under reduced pressure and the product distilled under an absolute pressure of approximately 1 mm. There was obtained 195 parts (48% theory) of an essentially colorless oil boiling between 231–237° C. at 0.8 mm. having a saponification value of 550 computed with the theoretical value of 620 for the pure ethylene glycol bis (isobutyl adipate). This ester was an excellent plasticizer for polyvinyl chloride, as will be shown in Example 10 following.

EXAMPLE 2

*Preparation of ethylene glycol bis(ethyl adipate)*

(alternate name: diethyl ethylene glycol diadipate)

C₂H₅OCO(CH₂)₄COO(CH₂)₂OCO(CH₂)₄COOC₂H₅

A vessel equipped with a reflux condenser was charged with 380 parts of the acid chloride of mono-ethyl adipate (delta-carbethoxy valeroyl chloride, made by the reaction of thionyl chloride with mono-ethyl adipate). The temperature of the liquid was brought to 100° C. and 60 parts of pure ethylene glycol was added during 65 minutes, the temperature being 105–127° C. A vigorous evolution of hydrochloric acid gas took place. 100 parts of xylene was added and the mixture heated under reflux (145–188° C.) for 160 minutes, until there was no further evolution of hydrochloric acid gas, then the xylene removed by distillation under reduced pressure. The product was obtained as an essentially colorless oil boiling between 200–220° C. at an absolute pressure of approximately 0.5 mm. of mercury, having a saponification value of 593 compared with a theoretical value of 598 for the pure ethylene glycol bis (ethyl adipate). The product was an excellent plasticizer for polyvinyl chloride.

EXAMPLE 3

*Preparation of polyethylene glycol bis (ethyl adipate)*

A vessel equipped with a stirrer and reflux condenser was charged with 353 parts of the acid chloride of mono-ethyl adipate and 170 parts of xylene. A mixture of 97.5 parts of a polyethylene glycol having the following analysis:

|  | Per cent |
|---|---|
| Ethylene glycol | 10–25 |
| Di-ethylene glycol | 73–83 |
| Tri-ethylene glycol and higher | 2– 5 | and 306 parts of quinoline was added during 75 minutes, the temperature being maintained at 45–47° C. The mixture was then held at the reflux (155–160° C.) for 90 minutes. The reaction mixture settled into two layers which were separated, and 200 parts water added to the lower layer. This aqueous layer was extracted with 264 parts of benzene and the benzene extract was then combined with the previously separated oil layer. The combined oil and benzene extracts were washed with 10% hydrochloric acid until free of excess quinoline, then with water, and the solvents and water removed by distillation under reduced pressure. The desired product was obtained as 246 parts of a pale yellow oil, boiling in the range 213–238° C. at 1 mm. of Hg absolute pressure. This material was a good plasticizer for polyvinyl chloride.

EXAMPLE 4

*Preparation of a polyester mixture from adipic acid, diethylene glycol and ethyl alcohol*

A mixture of 146 parts of adipic acid and 53 parts of diethylene glycol was heated in a vessel equipped with a condenser for distillation until 17 parts of water had been collected. A total of 3½ hours was required, the temperature rising from an initial 155° C. to 259° C. To the 182 parts of residue was added 51 parts of 95% ethanol, 86 parts of toluene and 0.5 part of p-toluenesulfonic acid and the mixture heated under reflux with a water separator attached for 4 hours. During this time the liquid which separated was saturated with potassium carbonate and the non-aqueous portion returned to the reaction vessel. The reaction product was washed with water and 5% sodium carbonate solution to remove acidic material and the solvents and intermediate reaction products removed by distillation at reduced pressure. The residue consisted apparently of diethylene glycol bis (ethyl adipate) and higher polymeric esters.

EXAMPLE 5

*Preparation of a polyester mixture from di-isobutyl adipate and ethylene glycol*

A vacuum reaction kettle equipped with a gas sparge and condenser for distillation was charged with 8256 parts of di-isobutyl adipate (DIBA), 22 parts of concentrated sulfuric acid, 87 parts of a decolorizing carbon and 496 parts of ethylene glycol. The temperature of the mixture was brought to 95–100° C. at an absolute pressure of approximately 3″ of mercury and was maintained in the kettle for 1 hour. Thereafter isobutanol began to distill slowly and the pressure was maintained at 1–3 inches of mercury to maintain a steady rate of distillation, keeping the vapor temperature in the range of 65–70° C. After approximately four hours under these conditions, the temperature of the reaction mixture was raised gradually during two hours to 135–140° C. at one inch of mercury absolute pressure and distillation of isobutanol continued until a total of 900 parts had been collected. The sulfuric acid catalyst was neutralized by the addition of 50 parts of sodium bicarbonate, the charge filtered, and the excess DIBA removed by distillation under reduced pressure. A residue, 2300 parts, was obtained which was washed with an aqueous solution of approximately 5% sodium carbonate until neutral, treated with decolorizing carbon, filtered and dried. This material was an outstanding plasticizer for polyvinyl chloride.

EXAMPLE 6

*Preparation of polyester mixture from mono-ethyl adipate and ethylene glycol*

A vessel equipped with a reflux condenser and water separator was charged with a mixture of 348 parts of mono-ethyl adipate, 505 parts of diethyl adipate, 62 parts of ethylene glycol, 264 parts of toluene and 1.8 parts of concentrated sulfuric acid. The mixture was heated under reflux, removing the water as formed, for 1 hour, collecting 43 parts of water. The mixture was washed with water and with a 10% sodium carbonate solution until neutral, then the solvent and unchanged diethyl adipate removed by distillation under reduced pressure. The pale yellow residue, 217 parts, was found to be an excellent plasticizer for polyvinyl chloride.

EXAMPLE 7

*Preparation of polyester mixture from di-n-propyl adipate and ethylene glycol*

A vessel equipped with a stirrer and condenser for distillation was charged with 1150 parts of di-n-propyl adipate and 20 parts of p-toluenesulfonic acid. The mixture was heated to 150° C. and 72.5 parts of ethylene glycol added in the course of 95 minutes. The mixture was then sparged with air at this temperature for 4¾ hours, collecting 172 parts of distillate. The reaction mixture was washed with water and with a 5% sodium carbonate solution, then the unchanged di-n-propyl adipate removed under reduced pressure. The residue, 354 parts, was washed with a 3% sodium bicarbonate solution until alkaline, heated with 20% by volume of a 5% sodium hypochlorite solution, decolorized with carbon and dried. This product, as in the case of the ethyl and isobutyl derivatives, was found to be excellent plasticizer for polyvinyl chloride.

Although by any of the methods referred to above, various combinations of bis and higher polymeric esters will be formed, we have found that it is not possible to achieve the same results by the direct interaction of calculated quantities of adipic acid, alcohol and glycol. For example, a series of reactions using 0.4, 0.5 and 0.6 mol respectively of ethylene glycol per mol of adipic acid, with corresponding amounts of isobutanol which would theoretically be required in each case to yield a neutral product, gave products in all cases containing excessive amounts of di-isobutyl adipate. Even when using glycol in the amount of 0.6 mol per mol of adipic acid and carrying out partial reaction of the glycol and adipic acid prior to the addition of the isobutanol, over ¼ of the product was found to be di-isobutyl adipate and thus of too high volatility to be of value in polyvinyl resins.

The reaction products made in this way also were characterized by a distribution of components radically different from those prepared by our preferred method as is apparent from the following example comparing the product prepared with 0.6 mol of glycol per mol of adipic acid, as described in the preceding paragraph, with that of Example 5.

EXAMPLE 8

| Method of Preparation | Viscosity of Reaction Prod. cps. | DIBA percent | Isobutyl Adipate Polyesters | | | |
|---|---|---|---|---|---|---|
| | | | Distillation Analysis | | | |
| | | | Intermed.[1] percent | Bis Ester,[2] percent | Residue, percent | Vis. of Residue, cps. |
| Direct interaction of component products | 52 | 26.5 | 2.0 | 17.6 | 53.0 | 165 |
| Example 5 product | 57 | trace | 3.5 | 54.0 | 41.0 | 100 |

[1] A fraction of the distilled material having a boiling point between the temperature at which the DIBA boils and the temperature at which the bis ester boils.
[2] Ethylene glycol bis (isobutyl adipate).

It is evident that when producing these esters of our invention by the preferred method a certain proportion will consist of bis ester and the remainder of a mixture of higher polymeric esters. However, as the molecular weight of the entire mixture will not exceed about 1000 we believe that none of the higher polymers will correspond to an $n$ value in the formula first set forth above of greater than 4.

We have found that we can to some extent control the proportion of bis ester formed by regulating the amount of alkyl adipate used in the reaction mixture. For best results we use an excess of adipate over the theoretical amount required for formation of the bis ester. The following example illustrates the yields of bis ester in per cent of theory achieved by varying the quantity of di-isobutyl adipate introduced into the reaction.

EXAMPLE 9

*Polyester mixtures from the reaction of di-isobutyl adipate (DIBA) and ethylene glycol*

| | Excess of DIBA over that required for formation of the bis ester [1] | | |
|---|---|---|---|
| | S-8, 20% | S-9, 100% | S-10, 200% |
| Yield of product, calculated as pure bis ester, percent of theory, based on ethylene glycol | 46.5 | 69.1 | 72.4 |
| Yield of product, calculated as pure bis ester, based on DIBA used, percent | 83.5 | 79.7 | 88.4 |
| Acidic material formed, calculated as percent of DIBA taken | 13.0 | 5.0 | 4.0 |
| DIBA recovered, percent | 40.5 | 51.8 | 68.8 |
| Refractive Index at 20° C | 1.4534 | 1.4514 | 1.4501 |
| Behavior in polyvinyl chloride composition | Excellent | Excellent | Excellent |

[1] Bis ester=ethylene glycol bis (isobutyl adipate).

It is of particular interest that essentially identical products were obtained as indicated by refractive indices whether 20%, 100% or 200% excess DIBA was used in the reaction with ethylene glycol. Each appears to be equally effective in the plasticization of polyvinyl chloride as shown in Example 10.

In accordance with the formulation

| | Parts |
|---|---|
| Polyvinyl chloride | 100 |
| Plasticizer | 55 |
| Basic lead carbonate | 1.6 |
| Stearic acid | 0.8 | samples were prepared each incorporating as the plasticizer one of the following:

S-1. Ethylene glycol bis (ethyl adipate)—a substantially pure bis ester.
S-2. Ethylene glycol bis (isobutyl adipate)—substantially pure bis ester.
S-3. Ethylene glycol (isobutyl adipate) polyester mixture—product of Ex. 5.
DOP. Di-2-ethylhexyl phthalate (dioctyl phthalate).
G-60. A resinous type plasticizer.
TCP. Tricresyl phosphate.
S-4. A mixture of 50% S-3 and 50% DOP.
S-5. A mixture of 50% S-3 and 50% G-60.
S-6. A mixture of 50% S-3 and 50% TCP.
S-7. Ethylene glycol (diethyl phthalate) polyester mixture, prepared by the method of Example 5.
S-8 ⎫
S-9 ⎬ Polyester mixtures from reaction of di-isobutyl adipate (DIBA), and ethylene glycol in proportions shown in Example 9.
S-10 ⎭

Symbols S-1, S-2, S-3, S-8, S-9 and S-10 designate embodiments of the formulation of our invention.

The compounds were blended by milling for about 5 minutes on rollers heated to 300° F. into a smooth, homogeneous sheet. The formed sheets were then compression molded for 5 minutes at 325° F. to a thickness of 0.075 inch and thereafter subjected to the various tests shown in Example 10.

EXAMPLE 10

| Plasticizer | S-1 | S-2 | S-3 | DOP | G-60 | TCP | S-4 | S-5 | S-6 | S-7 | S-8 | S-9 | S-10 |
|---|---|---|---|---|---|---|---|---|---|---|---|---|---|
| 100% Modulus,[1] p. s. i | 1,040 | 970 | 1,030 | 1,320 | 1,680 | 1,900 | 1,060 | 1,170 | 1,240 | 3,450 | 1,060 | 1,000 | 980 |
| Tensile, p. s. i | 2,440 | 2,150 | 2,720 | 2,220 | 2,860 | 3,150 | 2,710 | 2,780 | 2,920 | 3,800 | 2,740 | 2,940 | 2,850 |
| Elongation, percent | 310 | 260 | 340 | 230 | 300 | 290 | 360 | 350 | 310 | 250 | 280 | 320 | 310 |
| Hardness (Shore) | 79 | 81 | 84 | 87 | 93 | 95 | 84 | 86 | 86 | 100 | 82 | 83 | 82 |
| Brittle Point,[2] ° C | −45 | −40 | −35 | −35 | −25 | −5 | −30 | −30 | −30 | 0 | −35 | −30 | −35 |
| Flame Out Time [3] (secs.) | | | 0 | 57 | 9 | 0 | 17 | 0 | 0 | 6 | | | |
| Discoloration, hrs. at 150° C | (4) | (4) | 8+ | 4 | 8+ | 3 | 8+ | 8+ | | 1 | | | |
| Loss in wt. after 8 hrs., at 140° C, percent of original | | | 0.33 | 4.98 | | | | | | | | | |
| Elongation retained, percent of original, after 8 hrs. at 140° C | | | 95 | 62 | | | | | | | | | |
| Loss in wt. after 72 hrs., at 80° C., percent | | 0.40 | | 0.50 | | | | | | 0.33 | 0.46 | 0.55 | 0.58 |

[1] ASTM D-412-41-Die B.
[2] ASTM D-746-44T.
[3] Length of time 2 gram sample in ¼″ sq., continues to burn after removal from 30 sec. exposure to a Bunsen burner flame.
[4] Slight (after 8).

It will be noted that the plasticizers of our invention are more efficient than the other known plasticizers, notably in imparting lower modulus and hardness to the plastic product and improving its heat aging characteristics markedly. Whereas all of the stocks compounded with the other plasticizers darkened greatly after only a few hours at 150° C., those compounded with the compositions of our invention discolored only slightly and for the entire 8 hour test period remained light colored and pliable.

It will be noted that the plasticizers of our invention are useful in blends with known plasticizers now available. As shown in examples S–4, S–5 and S–6, addition of 50% of the materials of our invention with 50% D. O. P., T. C. P., or G–60 provide compositions having improved softness and heat-aging characteristics. It will further be noted that the improvements obtained are not directly proportional to the quantity of the ester of our invention added, but that these esters exhibit a marked synergistic effect in improving certain of the physical properties.

Another measure of the effectiveness of a plasticizer is that of its volatility. A plasticizer having low volatility is to be preferred over one of higher volatility. In this respect also the composition of our invention is superior to DOP, the superiority becoming greater as the plastic film becomes thinner. This is evident from the following example comparing samples plasticized with ethylene glycol (isobutyl adipate) polyester mixture (S–3) of our invention and DOP respectively in accordance with the formula set forth immediately preceding Example 10. The volatility of each sample was measured by percentage loss of weight after heating at 105° C. for 72 hours.

EXAMPLE 11

| Thickness of film | Loss in Weight, Percent | | |
|---|---|---|---|
| | 0.075″ | 0.040″ | 0.015″ |
| S–3 | 1.48 | 1.23 | 0.98 |
| DOP | 1.95 | 2.88 | 5.59 |

It is of added significance that whereas vinyls plasticized with DOP lose proportionately greater amounts of weight as the film decreases in thickness the reverse appears to be true with the composition of our invention, or, at least, decreasing the thickness of film does not increase the proportionate loss of plasticizer.

Having thus disclosed our invention and described in detail illustrative embodiments thereof, we claim as new and desire to secure by Letters Patent:

1. A plastic composition comprising a polyvinyl halide and a plasticizer having a molecular weight of less than 1000 and having the formula $$ROOC(CH_2)_4COO—[R_1—OCO(CH_2)_4COO]_n—R$$

in which R is an alkyl radical having from 1 to 6 carbon atoms, $R_1$ is a radical selected from the class consisting of ethylene and oxyethylene radicals, and $n$ has a value of at least one.

2. A plastic composition comprising a polyvinyl halide and a plasticizer being ethylene glycol bis (isobutyl adipate).

3. A plastic composition comprising a polyvinyl halide and a plasticizer being ethylene glycol bis (ethyl adipate).

4. The plastic composition as set forth in claim 1 in which R is the isobutyl group.

5. The method which comprises plasticizing polyvinyl halides by mixing therewith under the application of heat ethylene glycol bis (isobutyl adipate).

6. The method which comprises plasticizing polyvinyl halides by mixing therewith under the application of heat ethylene glycol bis (ethyl adipate).

7. A plastic composition comprising a polyvinyl halide and a plasticizer being ethylene glycol bis (alkyl adipate) in which the alkyl radical has from 1 to 6 carbon atoms.

8. The method which comprises plasticizing polyvinyl halides by mixing therewith under the application of heat ethylene glycol bis (alkyl adipate) in which the alkyl group has from 1 to 6 carbon atoms.

9. The method which comprises the step of plasticizing essentially polyvinyl halide by mixing therewith under the application of heat the mixed esters defined in claim 1.

10. A plastic composition as set forth in claim 1 in which the plasticizer is a mixture of compounds each of which is as therein defined, the R's representing the same alkyl radical.

References Cited in the file of this patent

UNITED STATES PATENTS

| Number | Name | Date |
|---|---|---|
| 2,075,107 | Frazier | Mar. 30, 1937 |
| 2,386,405 | Meincke | Oct. 9, 1945 |
| 2,497,433 | Blake | Feb. 14, 1950 |
| 2,617,779 | Griffith et al. | Nov. 11, 1952 |